United States Patent [19]

Shutterly

[11] Patent Number: 4,641,371
[45] Date of Patent: Feb. 3, 1987

[54] MULTI-STAR FIBER OPTIC NETWORK

[75] Inventor: Harold B. Shutterly, Edgewood Boro, Pa.

[73] Assignee: Westinghouse Electric Corp., Pittsburgh, Pa.

[21] Appl. No.: 692,254

[22] Filed: Jan. 16, 1985

[51] Int. Cl.$^4$ .............................................. H04B 9/00
[52] U.S. Cl. ........................................ 455/601; 370/3; 455/607; 455/612
[58] Field of Search ............... 455/607, 601, 612, 606; 370/3; 350/96.15, 96.16

[56] References Cited

U.S. PATENT DOCUMENTS

| | | | |
|---|---|---|---|
| 4,008,390 | 2/1977 | Runge | 250/205 |
| 4,027,153 | 5/1977 | Käch | 455/612 |
| 4,029,976 | 6/1977 | Fish et al. | 307/311 |
| 4,061,577 | 12/1977 | Bell | 370/3 |
| 4,074,127 | 2/1978 | Mochida et al. | 455/601 |
| 4,249,266 | 2/1981 | Nakamori | 455/608 |
| 4,257,125 | 3/1981 | Theall, Jr. | 455/608 |
| 4,262,366 | 4/1981 | Eumurian | 455/612 |
| 4,457,581 | 7/1984 | Johnson et al. | 350/96.16 |

FOREIGN PATENT DOCUMENTS

| | | | |
|---|---|---|---|
| 57-154955 | 9/1982 | Japan | 455/612 |
| 58-120330 | 7/1983 | Japan | 455/607 |

*Primary Examiner*—Joseph A. Orsino, Jr.
*Attorney, Agent, or Firm*—Daniel C. Abeles

[57] ABSTRACT

A multi-star fiber optic network includes a series of two or more passive transmission stars disposed in different local areas, each star serving terminal devices in its local area. A pair of repeaters between each successive star of the series receive optical signals on one channel and transmit the information on at least one different channel, thereby avoiding repeated reflections between successive stars. Wavelength multiplexing, frequency modulation, and amplitude modulation techniques may be employed to provide the different channels, one of which may be a baseband channel. Modified amplitude techniques may be employed to provide directional enable or inhibit signals on different channels.

26 Claims, 25 Drawing Figures

MULTI-STAR FIBER OPTIC NETWORK

BACKGROUND OF THE INVENTION

The present invention is directed to an optical communication network, and more particularly to a fiber optic network formed by interconnecting a number of passive transmissive stars, each star serving terminal devices in its local area.

Continuing improvements in the transmission quality of optical fibers, and in particular increased bandwidth and reduced attenuation rates, have made optical fiber communication networks an increasingly attractive alternative to networks which employ conductors as the transmission medium. In order to communicate optically, an electrical signal developed within a transmitting terminal device, such as, for example, a telephone, computer, or numerically controlled machine tool, is delivered to a transceiver within the terminal device. The transceiver uses the electrical signal to modulate light from a source such as LED or laser. The modulated light is then transmitted via an optical fiber to a transceiver within a receiving terminal device. The transceiver includes an optical detector, such as a photodiode, which reconverts the modulated optical signal into an electrical signal. Thus the transceivers within the terminal devices and the optical fibers connecting them effectively replace conductors which might otherwise have been used. Like conductors, optical fibers can transmit information in either analog or digital form.

A transmissive fiber optic star is a passive coupling device used to interconnect a number of terminal devices in a network. The physical structure of such a star is illustrated schematically in FIG. 1A, wherein four optical fibers have been fused at a tappered region 20 to provide a star 22 having light input ports 24, 26, 28, and 30 and light exit ports 32, 34, 36, and 38. Light entering star 22 through any of the input points 24–30 is equally distributed to all of the exit ports 32–38. For example, if light having an intensity of one unit were introduced into input port 24, light having an intensity of one quarter unit (neglecting minor losses) would be admitted through each of exit ports 32–38. Star 22 could be used to interconnect four terminal devices, each terminal device being separately connected via optical fibers to one of the input ports and one of the output ports.

Figure 1A:
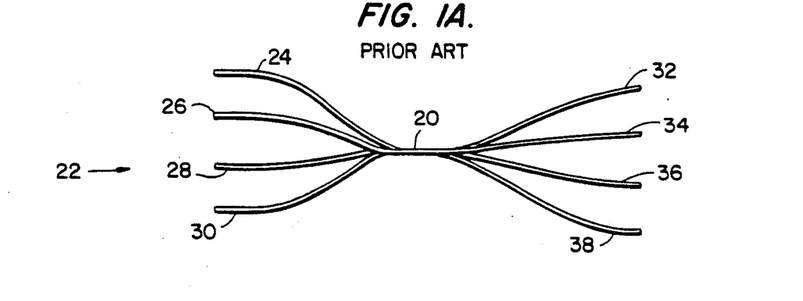
FIG. 1A is a plan view of a fiber optic star having four light input ports and four light exit ports.

Stars are not limited to four pairs of ports, as in the example of FIG. 1A. However the number of terminal devices that can be interconnected via a single star is generally under 80. This limitation is caused partly by difficulties in fabricating larger stars (i.e., stars with more than 80 pairs of ports). Another limiting consideration is that the optical power available at each light exit port is inversely proportional to the total number of exit ports. Thus the available transceiver sensitivity effectively imposes a limitation upon the star itself.

Figure 1B:
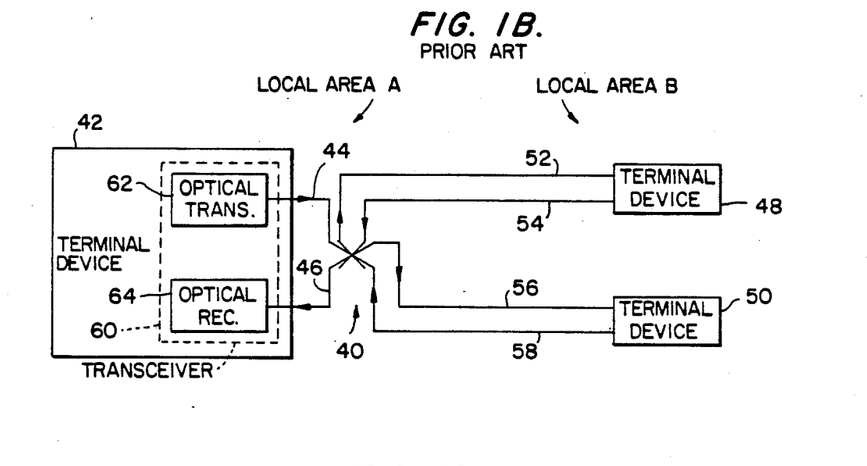
FIG. 1B is a schematic diagram illustrating a fiber optic communication network utilizing a single star, the terminal devices which are interconnected by the star being disposed in different local areas.

FIG. 1B schematically illustrates a fiber optic communication network employing a star 40. In this Figure, terminal device 42 in Local Area A is connected to a light input port and a light exit port of star 40 by fibers 44 and 46, respectively. Similarly, terminal devices 48 and 50 in Local Area B are connected to star 40 by fibers 52, 54, 56 and 58. Each terminal device has a transceiver, although only transceiver 60 in terminal device 42 is illustrated. Transceiver 60 includes an optical transmitter 62 which receives digital electrical signals from terminal device 42 and launches optical signals on fiber 44. Transceiver 60 also includes an optical receiver 64 which receives optical signals from fiber 46 and provides digital electrical signals to terminal device 42.

Figure 1C:
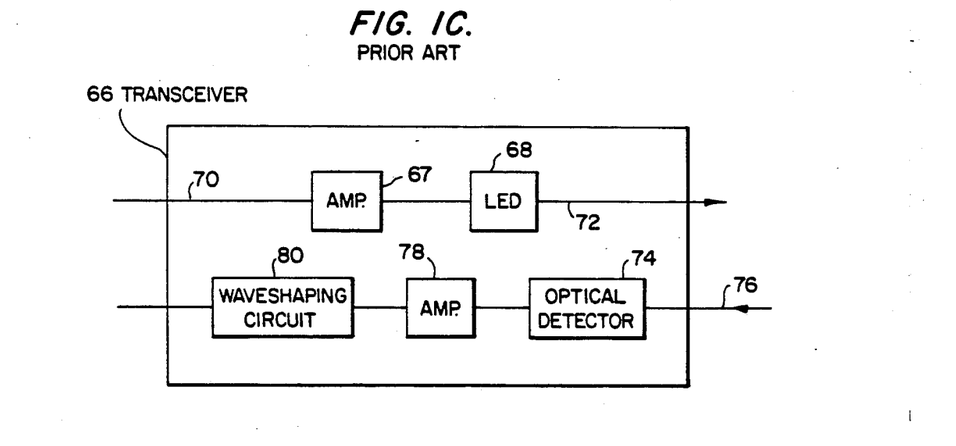
FIG. 1C is a schematic block diagram illustrating a simple example of a transceiver for coupling digital signals from a terminal device to a fiber optic network.

Sophisticated digital communication techniques have been applied to optical networks, and it will be apparent that transmitter 62 and receiver 64 may be correspondingly sophisticated. Their precise configurations would depend upon such matters as the nature of the digital coding scheme employed and the communication protocol. However, as a simple example, FIG. 1C illustrates a transceiver 66 having an optical transmitter consisting of driver amplifier 67 which receives a bit stream from the associated terminal device via conductors 70 and an LED 68 which emits a corresponding stream of ON or OFF light pulses to the end of fiber 72. The optical receiver in transceiver 66 includes an optical detector 74, such as a silicon photodiode, which receives pulses of light emitted from the end of fiber 76. The electrical signal from detector 74 is amplified by amplifier 78 and given sharp rising and falling edges by waveshaping circuit 80, such as a Schmidt trigger, which supplies digital data in electrical form to the associated terminal device.

FIG. 1B illustrates a primary problem which is encountered in single star fiber optic networks. If the terminal devices are widely dispersed, a large amount of fiber is required to run a separate pair of fibers from the star to each terminal device. This increases cabling complexity and network costs. For example if Local Area A represents a suite of offices in one building and Local Area B represents a suite of offices in a building a block away, an appreciable amount of fiber would be required to interconnect as few as 10 terminal devices in Local Area A and another 10 terminal devices in Local Area B. It will be apparent that, although the schematic symbol for star 40 suggests only 4 pairs of ports, which could be used to interconnect only four terminal devices, no such limitation is intended. As was mentioned above the capacity of the star is frequently significantly greater, and in practice star 40 would typically be used to interconnect more than the three terminal devices illustrated in FIG. 1B.

Figure 2A:
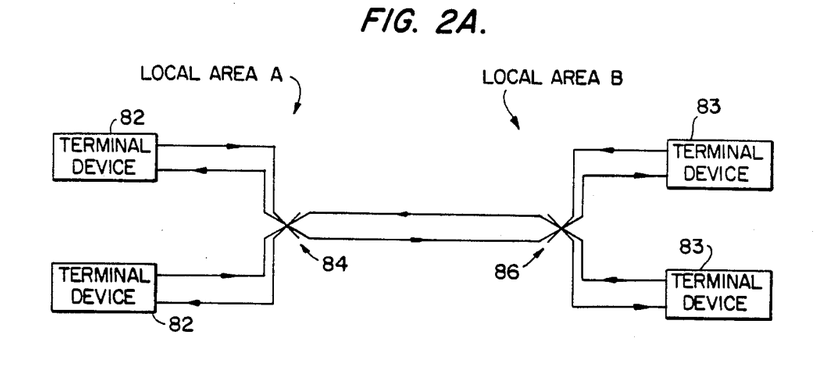
FIG. 2A schematically illustrates a generally unacceptable way to utilize a pair of stars to interconnect terminal devices in different local areas in order to reduce the amount of fiber that would be necessary in a one-star communication network.

As is illustrated in FIG. 2A, one might attempt to reduce the amount of fiber required to interconnect a plurality of terminal devices 82 in Local Area A with a plurality of terminal devices 83 in Local Area B by using a star 84 positioned within Local Area A and a star 86 positioned within Local Area B, the stars 84 and 86 being interconnected by a single pair of fibers. A pulse of light emitted by one of the terminal devices in Local Area A, for example, would be distributed to the remaining terminal devices 82 by star 84. Star 84 would also distribute the pulse to star 86, which in turn would distribute the signal to the terminal devices 83 in Local Area B. However, if star 84 had N pairs of ports, only 1/N of the optical power would be delivered to star 86. If star 86 also had N pairs of ports, it will be apparent that the optical power provided to each of devices 83 would be only $1/N^2$. If there were three stars, the factor would be $N^3$, etc. The repeated power attenuation would render the configuration of FIG. 2A unsatisfactory in a typical practical application.

Figure 2B:
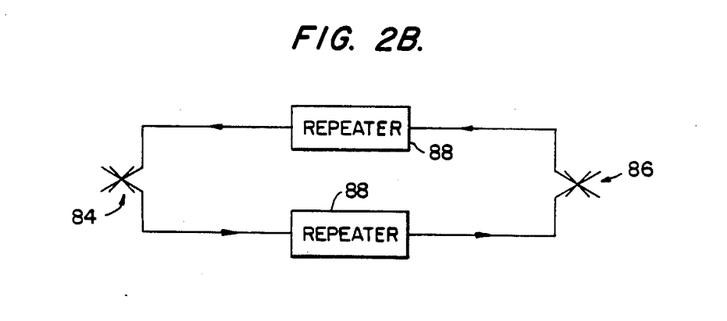
FIG. 2B schematically illustrates a generally unacceptable modification of the network of FIG. 2A.
Figure 2C:
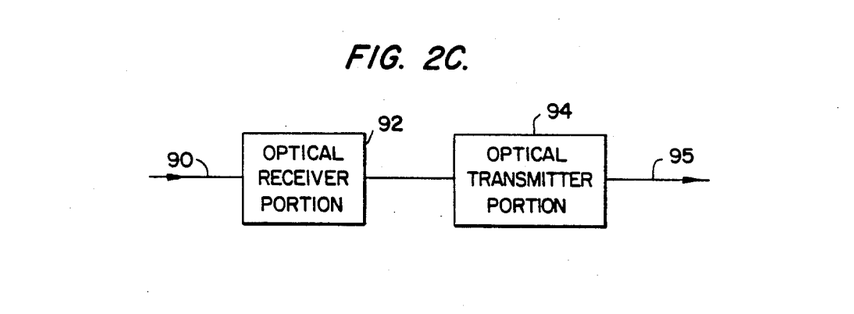
FIG. 2C is a schematic block diagram illustrating the general features of a repeater.

One might attempt to avoid this power reduction by providing repeaters 88 in the optical fibers connecting stars 84 and 86, as is illustrated in FIG. 2B. In general a repeater includes an optical receiver portion and an optical transmitter portion. This general configuration is illustrated in FIG. 2C, wherein optical signals from fiber 90 are provided to optical receiver portion 92, the output of which is an electrical signal corresponding to the optical signal. This electrical signal is then re-converted to an optical signal by optical transmitter portion 94, the optical signal being emitted on fiber 95. As was the case of the optical transmitter and optical receiver within the transceiver of a terminal device, the particular configurations of optical receiver portion 92 and optical transmitter portion 94 of the repeater depend upon the nature of the communication network. However, in a network employing the transceivers 66 of FIG. 1C optical receiver portion 92 of a repeater might consist of a series connection of an optical detector, an amplifier, and a waveshaping circuit, with optical transmitter portion 94 being a driver amplifier and LED.

Returning to FIG. 2B, it will be apparent that the insertion of repeaters 88 between stars 84 and 86 in an attempt to overcome the power division problem discussed above would be unsatisfactory. A pulse of light emitted "upstream" by star 84 would be regenerated by repeater 88 before reaching star 86, which would return the pulse downstream to star 84. Since the repeaters 88 must have sufficient sensitivity to detect an input signal from any terminal device connected to one star and sufficient output power to transmit effectively to any terminal device connected to the other star, the closed loop configuration of FIG. 2B would result in instability. Essentially, each repeater 88 endlessly repeats the output of the other repeater 88.

One might attempt to avoid this problem by electrically connecting the repeaters 88 so that they cannot both be operative simultaneously. This expedient, however, would not entirely avoid the problem. Assume, for example, that a pulse stream is emitted from star 84 to star 86 and that the bottom repeater 88 deactivates the top repeater 88 as the bit stream passes. Due to propagation delays, however, the top repeater 88 would become operative before completion of the signal reflection by star 86. In order to ensure reliable operation it would be necessary to deactivate one repeater 88 for an additional period following the period in which the bottom repeater 88 is operative. The additional deactivation period required would equal the time required for optical signals to propagate from the bottom repeater 88 through star 86 to the top repeater 88. The increased delay would be significant if long fiber lengths are involved. Further, for signals propagating through the top repeater 88, a different period of deactivation might be required for the bottom repeater 88, since this would depend on the signal propagation time from repeater to repeater through star 84, which might be at a different distance from the repeaters than is star 86.

SUMMARY OF THE INVENTION

Accordingly, an object of the present application is to provide a multi-star fiber optic network wherein a plurality of optical channels are employed in order to permit gain to be added between stars without subjecting the network to instability resulting from repeated signal reflection between adjacent stars.

Another object of the present invention is to provide a multi-star network which employs a plurality of optical channels which impart directional information to impose constraints on the direction in which optical signals can move.

Another object of the present invention is to provide a multi-star fiber optic network employing repeaters that are disposed between the stars and that transmit on at least one optical channel that is different from the optical channel on which they receive.

Another object of the present invention is to provide a multi-star fiber optic network employing terminal devices with transceivers having optical transmitters which provide optical signals on a plurality of channels.

Another object of the present invention is to provide a multi-star fiber optic network employing wavelength multiplexing, frequency modulation, amplitude modulation, or modified amplitude modulation techniques to avoid instability.

Another object of the present invention is to provide a multi-star fiber optic network wherein one optical channel is employed to communicate locally and different optical channels are employed for communication in "upstream" and "downstream" directions. One or more additional channels may also be employed at a junction point if network branches are needed.

These and other objects can be attained by providing a fiber optic network wherein upstream and downstream repeaters are disposed between adjacent stars in a sequence of at least two stars in order to reduce power losses as optical signals are transmitted from one star to another. In order to avoid instability arising from reflections the upstream repeaters are not responsive to the output of the downstream repeaters, and vice versa. In a network having two stars, each star is an "external" star, and the transceivers of the terminal devices connected to both stars transmit on channels A and B but can receive on channel A alone. Conversely, the repeaters can receive on channel B alone and transmit on channel A alone. When there are more than two stars in the sequence, so that "internal" stars are present in addition to the external stars, the transceivers of the terminal devices directly connected to the internal stars receive on a local channel and transmit on the local channel, an upstream channel, and a downstream channel. Upstream repeaters connected between adjacent internal stars receive on the upstream channel but transmit on both the local and upstream channel. Downstream repeaters between adjacent internal stars, on the other hand, receive on the downstream channel but transmit on the local and downstream channels. The channels may be obtained by wavelength multiplexing techniques. Alternately, frequency multiplexing may be used, with one or more of the channels obtained via frequency modulation or amplitude modulation of electrical carrier signals. A baseband channel may be used with one or more AM or FM channels.

In the amplitude modulation system, the local channel may be provided by the baseband signal, the upstream channel may be provided by a first oscillator gated by the baseband signal, and the downstream channel may be provided by a second oscillator gated by the baseband signal. In a modified amplitude modulation system, the upstream and downstream channels are provided by upstream and downstream tones that are continuously present during message transmission, without being gated by the baseband signal. Upstream and downstream enable tones may be employed to enable the upstream and downstream repeaters, the transceiver of each terminal device connected to an internal star emitting the baseband signal and both upstream and downstream tones. However, if upstream and downstream inhibit tones are employed, the transceivers of terminal devices connected to intermediate stars may transmit on the baseband channel alone.

DESCRIPTION OF THE PREFERRED EMBODIMENTS

Figure 3:
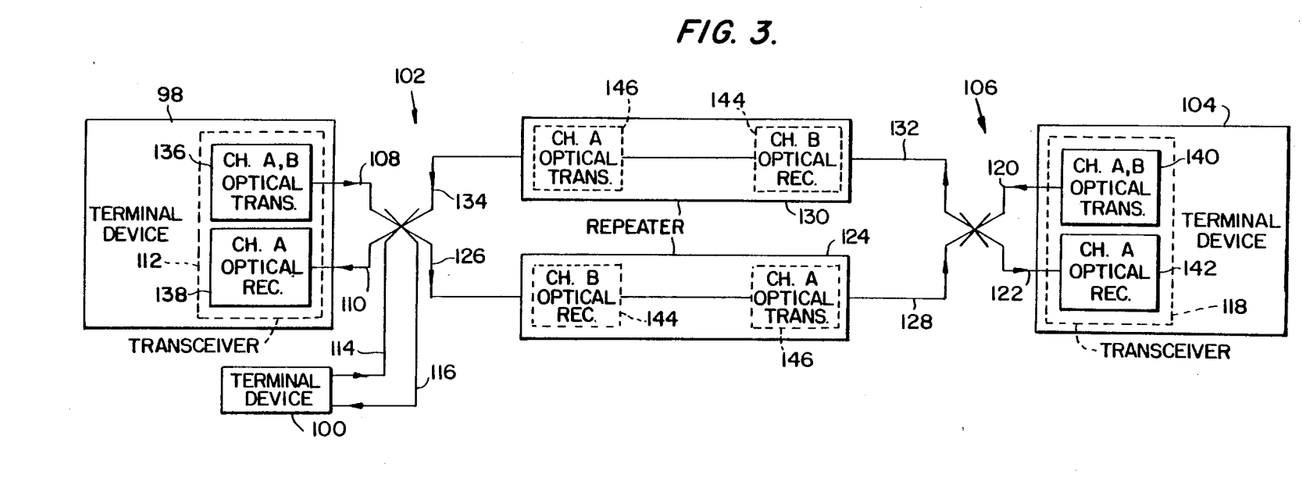
FIG. 3 schematically illustrates a multi-star fiber optic network according to the present invention.

With initial reference to FIG. 3, multi-star fiber optic network 96 includes terminal devices 98 and 100 which are disposed with star 102 in one local area, and terminal device 104 which is disposed with star 106 in a different local area. Optical fibers 108 and 110 connect the transceiver 112 of terminal device 98 with a light input port and light exit port, respectively, of star 102. In similar manner the transceiver (not illustrated) of terminal device 100 is connected to light input and exit ports of star 102 by fibers 114 and 116, and transceiver 118 of terminal device 104 is connected to light input and exit ports of star 106 by fibers 120 and 122, respectively. It will be apparent to those skilled in the art that stars 102 and 106 could support more terminal devices than are illustrated in FIG. 3, depending upon the number of input and output ports of the stars. Repeater 124 is connected by optical fiber 126 to a light exit port of star 102 and by fiber 128 to a light input port of star 106. Repeater 130 is connected to a light exit port of star 106 by fiber 132 and to a light input port of star 102 by fiber 134.

With continuing reference to FIG. 3, the optical transmitter 136 of transceiver 112 transmits on channels A and B while the optical receiver 138 receives on channel A. Similarly, the optical transmitter 140 of transceiver 118 transmits on channels A and B and the optical receiver 142 receives on channel A. Other terminal devices in the network, such as device 100, also transmit on channels A and B and receive on channel A. Optical receiver portions 144 of repeaters 124 and 130 receive on channel B, and optical transmitter portions 146 of repeaters 124 and 130 transmit on channel A.

The general operation of network 96 will now be described. Assume that terminal device 98 has generated an electrical signal corresponding to information which is to be conveyed to terminal device 100. Optical transmitter 136 transforms the electrical signal into an optical signal on channel A and an optical signal on channel B, so that channels A and B both have optical signals corresponding to the original electrical signal. These optical signals are conveyed via fiber 108, star 102, and fiber 116 to the transceiver (not illustrated) of terminal device 100. This transceiver receives the optical information on channel A (and may ignore the same information on channel B), and converts the optical information to an electrical signal corresponding to the original electrical signal within terminal device 98.

Next, assume that the information from terminal device 98 is to be conveyed to terminal device 104. The optical signal on channels A and B from optical transmitter 136 is conveyed via fiber 108, star 102 and fiber 126 to the optical receiver portion 144 of repeater 124. Optical receiver portion 144 receives on channel B. Receiver portion 144 generates an electrical signal corresponding to the original electrical signal from terminal device 198 and provides this electrical signal to optical transmitter portion 146, which produces an optical signal on channel A alone. This optical signal is conveyed via fiber 128, star 106, and fiber 122 to optical receiver 142 of transceiver 118, which produces an electrical signal corresponding to the electrical signal originally provided by terminal device 98. Repeater 124 provides gain between stars 102 and 106, so that the optical power delivered to transceiver 118 is 1/N times the optical power provided by optical transmitter 146 rather than $1/N^2$ times the optical power provided by optical transmitter 136 (where stars 102 and 106 each have N pairs of ports). However network 96 is not subject to instability. The channel A optical signal on fiber 128 is conveyed via star 106 and fiber 132 to the optical receiver portion 144 of repeater 130 but, since portion 144 is configured to receive optical signals only on channel B, it generates no electrical signal for the optical transmission portion 146 of repeater 130. The net result is that the optical signal from repeater 124 is indeed returned by star 106, but it is not conveyed back to star 102 by repeater 130.

The optical signals employed within network 96 may be obtained by wavelength multiplexing, frequency modulation, or amplitude modulation. An example of the wavelength multiplexing technique will be discussed with reference to FIGS. 4A and 4B.

Figure 4A:
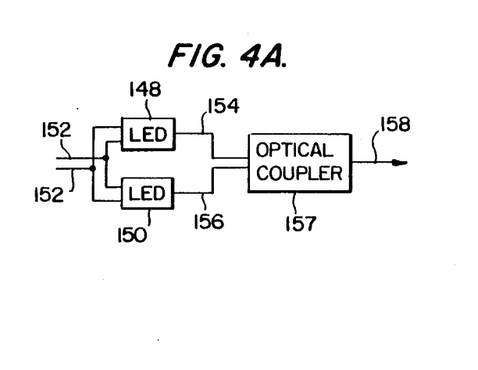
FIGS. 4A and 4B are schematic block diagrams illustrating simple examples of an optical transmitter and optical receiver, respectively, which are suitable for use in the terminal devices of FIG. 3 when wavelength multiplexing is employed.

FIG. 4A schematically illustrates a channel A and B optical transmitter for use in the transceiver, such as transmitter 136 of terminal device 98. LED 148 emits light at a channel A wavelength, such as 840 nanometers, and LED 150 emits light at a channel B wavelength, such as 1060 nanometers. LED's 148 and 150 are electrically connected in parallel by conductors 152, which received digital signals in serial form from the associated terminal device. Optical fibers 154 and 156 comprise the two inputs to an optical coupler 157, which provides an output on fiber 158. Light from LED 148 is collected by optical fiber 154 and light from LED 150 is collected by fiber 156. Accordingly, if a digital "1" is to be transmitted, both of LED's 148 and 150 are illuminated and fiber 158 transmits light at both the channel A and the channel B wavelength. On the other hand if a digital "0" is to be transmitted, neither of LED's 148 or 150 is illuminated. The optical receiver for the transceiver may be an optical detector such as a silicon photodiode, which is responsive to either the channel A and channel B wavelength. It should be noted that LED's typically have 50 nanometer bandwidths, so that there would be negligible overlap between channels A and B if 840 and 1060 nanometers were selected for the LED's. Silicon photodiodes are sensitive across the 700–1100 nanometer band, and moreover optical fibers are commercially available which provide an excellent transmission medium across this band. An LED having a center wavelength which is above the 700–1100 nanometer band, such as 1300 nanometers, could also be employed with an In Ga As detector, or laser diodes might be used.

Figure 4B:
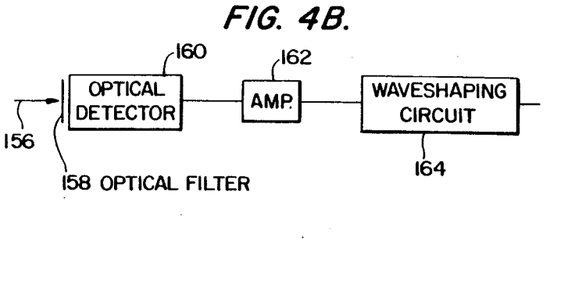

FIG. 4B schematically illustrates an optical receiver portion for a repeater, such as portion 144 of repeater 124. Fiber 156 conveys light at wavelengths A and B to optical filter 158, which permits only wavelength B to pass. Optical detector 160 generates an electrical signal which is amplified by amplifier 162 and given sharp leading and trailing edges by waveshaping circuit 164, such as a Schmidt trigger. The optical transmitter portion of the repeater can be provided by a channel A LED.

An example of the frequency modulation technique for network 96 will be discussed with reference to FIGS. 5A–5D. For the sake of illustration it will be assumed that a terminal device having information to transmit presents a bit stream to the associated transceiver at a 2 megabit per second data transmission rate, so that it takes half a microsecond to transmit a "one" and half a microsecond to transmit a "0." It will also be assumed that channel A is a baseband channel (that is, a "1" is represented optically by a high level light signal lasting half a microsecond and a "0" is represented by a low level light signal lasting half a microsecond), and that frequency shift keying is used on channel B, the channel B frequency changing between 6 MHz (representing a "0") and 8 MHz (representing a "1").

Figure 5A:
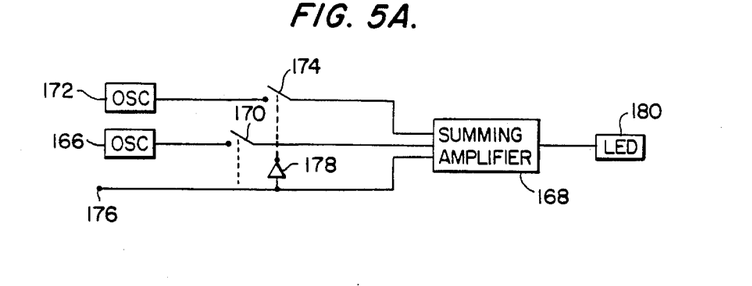
FIG. 5A is a schematic block diagram illustrating a simple example of an optical transmitter which is suitable for use in the terminal devices of FIG. 3 when frequency modulation is employed in the network.

FIG. 5A schematically illustrates an optical transmitter for use in the transceiver of a terminal device, such as transmitter 136 in FIG. 3. The output of 8 MHz oscillator 166 is electrically connected to an input of summing amplifier 168 via electrically controlled switch 170. The output of 6 MHz oscillator 172 is also connected to an input of amplifier 168 via electrically controlled switch 174. The bit stream from the terminal device is provided to terminal 176, which is electrically connected to an input of amplifier 168. When the signal on terminal 176 is "1," switch 170 is closed to provide the output of oscillator 166 to amplifier 168. Switch 174 is controlled through inverter 178, so that the output of oscillator 172 is provided to amplifier 168 when "0" appears on terminal 176. LED 180 is connected to the output of amplifier 168. Amplifier 168 is turned OFF, by circuitry not shown, when the associated terminal device is not transmitting a message.

Figure 5B:
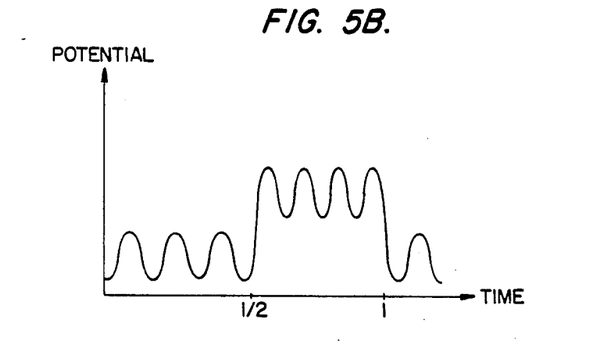
FIG. 5B is a waveform diagram illustrating an example of the electrical signal supplied to the LED in FIG. 5A.

Amplifier 168 is biased so that its output does not undergo a zero crossing regardless of the signal applied to terminal 176. FIG. 5B illustrates the output of amplifier 168 when a "1" and "0" are applied to terminal 176. When the "1" is applied, the output represents an 8 MHz signal from oscillator 166 superimposed on the baseband signal. On the other hand, when a "0" is applied to terminal 176, the output of amplifier 168 represents the sum of the 6 MHz signal from oscillator 172 plus a slight offset. The optical signal emitted by LED 180, of course, also varies in intensity in the manner illustrated in FIG. 5B.

Figure 5C:
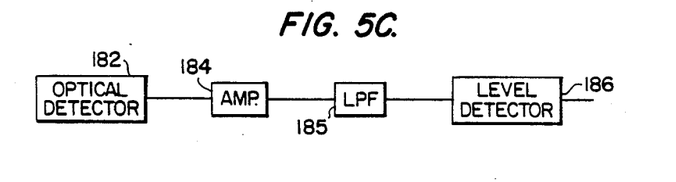
FIG. 5C is a schematic block diagram illustrating a simple example of an optical receiver which is suitable for use in the terminal devices of FIG. 3 when frequency modulation is employed in the network.

FIG. 5C illustrates an optical receiver suitable for use in the transceiver of the terminal device, such as receiver 138 in FIG. 3. The optical signal is received by optical 182, amplified by amplifier 184, filtered by lowpass filter 185, and provided to level detector 186, which recovers the baseband signal on channel A (although circuitry for recovering the broad band signal on channel B might alternately be employed). In effect, the circuitry of FIG. 5C simply ignores the 6 and 8 MHz signals superimposed on the baseband signal.

Figure 5D:
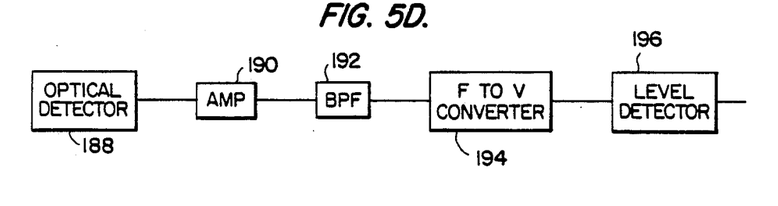
FIG. 5D is a schematic block diagram illustrating a simple example of the optical receiver portion of a repeater which is suitable for use in the network of FIG. 3 when frequency modulation is employed.

FIG. 5D illustrates an optical receiver portion suitable for use in a repeater, such as portion 144 in repeater 124. The optical signal is received by optical detector 188 and amplified by amplifier 190. The output of amplifier 190 is provided to bandpass filter 192, which strips away the baseband signal and any high frequency noise. Frequency-to-voltage converter 194 then produces a low voltage output when the 6 MHz signal is present and a high voltage output when the 8 MHz signal is present, and level detector 196 provides a digital output signal. The optical transmitter portion of the repeater can simply be an LED, which provides an optical baseband signal corresponding to the electrical baseband signal produced by level detector 196.

Figure 6:
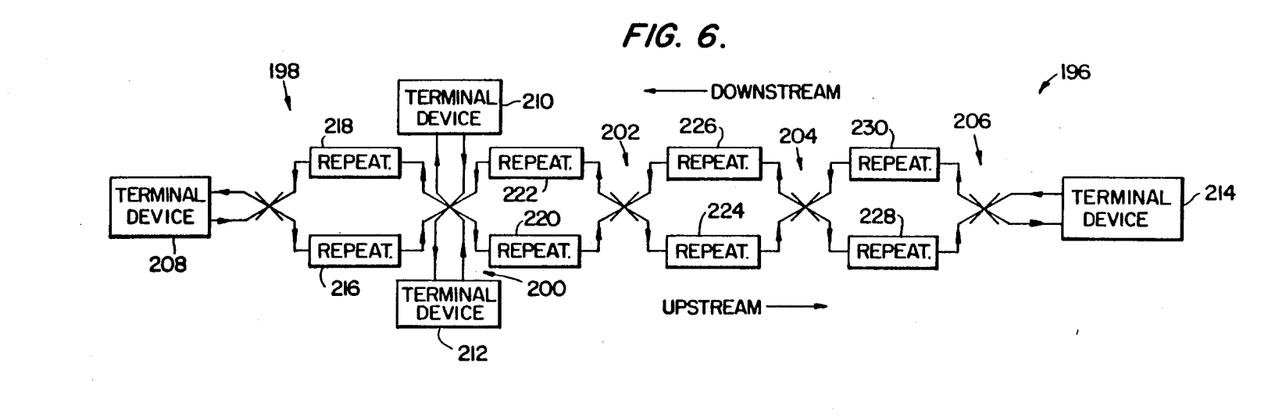
FIG. 6 schematically illustrates an example of a multi-star fiber optic network according to the present invention when a series of more than two stars are present.

Turning next to FIG. 6, the present invention is not limited to use in a two-star system such as that of FIG. 3. Multi-star fiber optic network 196 includes stars 198, 200, 202, 204, and 206, each of which is disposed in a different local area and each of which is connected to a plurality of terminal devices in that local area. However, in FIG. 6 only terminal devices 208, 210, 212, and 214 are illustrated. Star 198 is connected to star 200 by repeaters 216 and 218; star 200 is connected to star 202 by repeaters 220 and 222; star 202 is connected to star 204 by repeaters 224 and 226; and star 204 is connected to star 206 by repeaters 228 and 230. As an arbitrary convention to facilitate discussion, FIG. 6 illustrates "upstream" and "downstream" directions. In a similar manner repeaters 216, 220, 224, and 228 can be referred to as "upstream" repeaters while repeaters 230, 226, 222, and 218 can be referred to as "downstream" repeaters.

Three communication channels are employed in network 196. Local channel A is used to communicate with other terminal devices that are directly connected to the same star. For example, terminal device 212 in FIG. 6 communicates with terminal device 210 via channel A. Channel B is the upstream channel, which is used to communicate with terminal devices that are connected to an upstream star. For example, terminal device 212 communicates with terminal device 214 via channel B. Finally, channel C is the downstream channel, which is used to communicate with terminal devices connected to downstream stars. For example, terminal device 212 communicates with terminal device 208 via channel C.

For purposes of discussion it is useful to distinguish "external stars" at either end of the sequence of stars (that is, stars 198 and 206) and "internal stars" that are disposed between the external stars. Similarly, an "external component" is one which is directly connected to an external star. For example, terminal device 208 and repeaters 216 and 218 are external components which are directly connected to external star 198. "Internal components," on the other hand, are the remaining components, those which are connected only to internal stars. For example terminal devices 210 and 212 and repeaters 220 and 222 are internal components.

With continuing reference to FIG. 6, the optical transmitters in the transceivers of the internal terminal devices all transmit on channels A, B, and C, while the optical receivers of these transceivers receive on channel A. The internal, upstream repeaters have optical transmitter portions which transmit on channels A and B and optical receiver portions which receive on channel B. Finally, the optical transmitter portions of the internal, downstream repeaters transmit on channels A and C, and the optical receiver portions receive on channel C. For example, internal terminal device 212 in FIG. 6 transmits on channels A, B, and C, upstream repeater 220 receives on channel B and transmits on channels A and B, and downstream repeater 222 receives on channel C and transmits on channels A and C.

For purposes of illustration, suppose that terminal device 212 transmits a message, the message being emitted simultaneously on channels A, B, and C. This message would reach terminal device 210, which receives on channel A. The message would also reach a terminal device (not illustrated) connected to star 202 since the channel B message would be transformed to channels A and B by repeater 202. The terminal device (not illustrated) connected to star 202 would receive the message via channel A. Repeater 224 would receive the channel B message and produce an output on channels A and B to send the message further upstream. On the other hand, if a terminal device (not illustrated) connected to star 202 emitted a message, repeater 222 would receive this message on channel C and transform it to channels A and C.

In summary, the internal terminal devices transmit on local channel A, upstream channel B, and downstream channel C. A message to another terminal device connected to the same star reaches that terminal device via channel A, since all of the terminal devices receive on channel A. Messages reach terminal devices connected to upstream stars because the upstream repeaters receive on upstream channel B and transmit on local channel A (for terminal devices connected to the subsequent upstream star) and on upstream channel B (for reception by the subsequent upstream repeater). Similarly, messages reach terminal devices connected to downstream stars because the downstream repeaters receive on downstream channel C and transmit on local channel A (for terminal devices connected to the subsequent downstream star) and on downstream channel C (for receipt by the subsequent downstream repeater). If desired, the external components can be simplified somewhat. Since there are no stars downstream from external star 198, the terminal devices connected thereto need only transmit on local channel A and upstream channel B. External repeater 216, like the internal upstream repeaters, receives on upstream channel B and transmits on local channel A and upstream channel B. Unlike the internal downstream repeaters, however, external downstream repeater 218 receives on downstream channel C but transmits only on local channel A, since there are no stars downstream of star 198. For similar reasons the external components connected to external star 206 can be simplified as follows: repeater 228 receives on upstream channel B and transmits on local channel A, terminal device 214 receives on local channel A and transmits on local channel A and downstream channel C, and repeater 230 receives on downstream channel C and transmits on local channel A and downstream channel C. The foregoing relationships are summarized in Table I below:

TABLE I

| | TRANSMITTING CHANNEL | RECEIVING CHANNEL |
|---|---|---|
| UPSTREAM REPEATERS | | |
| 216 | A and B | B |
| 220 | A and B | B |
| 224 | A and B | B |
| 228 | A | B |
| DOWNSTREAM | | |

TABLE I-continued

| | TRANSMITTING CHANNEL | RECEIVING CHANNEL |
|---|---|---|
| REPEATERS | | |
| 218 | A | C |
| 222 | A and C | C |
| 226 | A and C | C |
| 230 | A and C | C |
| TERMINAL DEVICES CONNECTED TO STARS | | |
| 198 (external) | A and B | A |
| 200 (internal) | A, B, and C | A |
| 202 (internal) | A, B, and C | A |
| 204 (internal) | A, B, and C | A |
| 206 (external) | A and C | A |

It will be apparent to those skilled in the art that the wavelength multiplexing or frequency multiplexing techniques discussed with reference to FIG. 3 could easily be expanded for use in network 196 of FIG. 6. For example, in the wavelength multiplexing technique an additional channel could be provided by adding another LED, and different wavelengths could be detected by positioning detectors at different locations about a defraction grading. However specific examples for implementing network 196 will be discussed with reference to the amplitude modulation technique. FIGS. 7A-7E will be employed in this discussion, where once again a 2 megabit per second data transmission rate is assumed. The baseband signal provides local channel A, while upstream channel B is a 6 MHz signal and downstream channel C is a 12 MHz signal.

Figure 7A:
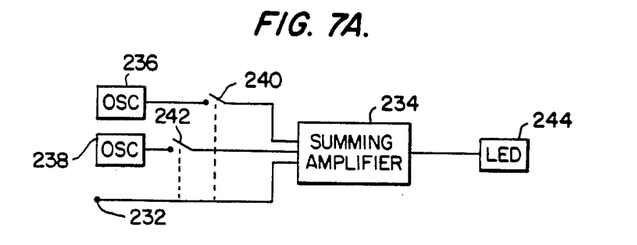
FIG. 7A is a schematic block diagram illustrating a simple example of an optical transmitter which is suitable for use in the terminal devices of FIG. 6 when amplitude modulation is employed in the network.
Figure 7B:
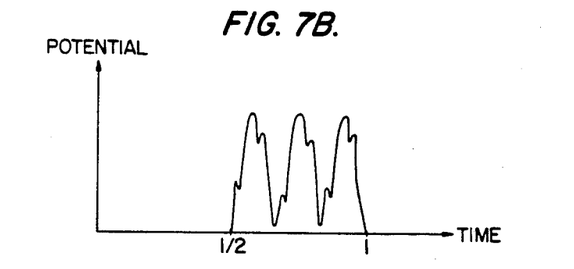
FIG. 7B is a waveform diagram illustrating an example of the electrical signal provided to the LED of FIG. 7A.

FIG. 7A illustrates an optical transmitter for the transceiver of an internal terminal device. The bit stream is applied to terminal 232, which is electrically connected to an input of summing amplifier 234. Six MHz oscillator 236 and twelve MHz oscillator 238 are connected to other inputs of amplifier 234 via electrically controlled switches 240 and 242. When an electrical "1" appears at terminal 232, amplifier 234 adds this to the 6 and 12 MHz signals from oscillators 236 and 238, producing the waveform illustrated in FIG. 7B. LED 244 produces a corresponding optical signal. When an electrical "0" is applied to terminal 232, however, LED 244 is not illuminated.

Figure 7C:
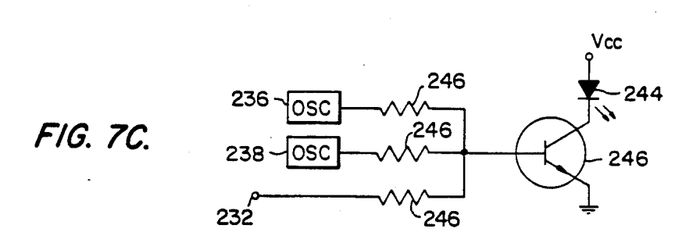
FIG. 7C is a schematic diagram illustrating a particularly simple circuit for implementing FIG. 7A.

A particularly simple implementation of FIG. 7A is illustrated in FIG. 7C, wherein resistors 246 add the input signals and apply them to the base of transistor 246. Transistor 246 is biased to be at cutoff when the signal on terminal 232 is "0."

Figure 7D:
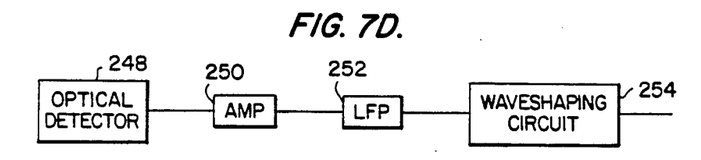
FIG. 7D is a schematic block diagram illustrating a simple example of an optical receiver which is suitable for use in the terminal devices of FIG. 6 when amplitude modulation is employed.

FIG. 7D illustrates the circuitry for the optical receiver in the transceiver of an internal terminal device. The optical signal is received by optical detector 248 and amplified by amplifier 250. The 6 and 12 MHz signals are stripped away by lowpass filter 152, and the resulting baseband signal is given sharp transitions by waveshaping circuit 254.

Figure 7E:
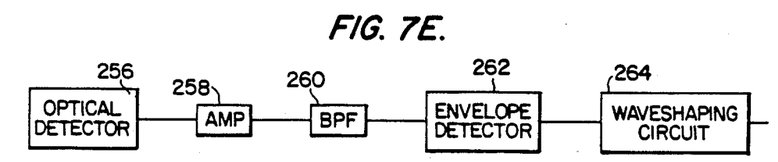
FIG. 7E is a schematic block diagram illustrating a simple example of the receiver portion of a repeater that is suitable for use in FIG. 6 when amplitude modulation is employed in the network.

FIG. 7E illustrates circuitry suitable for use as the optical receiver portion of a repeater. The optical signal is received via optical detector 256 and amplified by amplifier 258. Bandpass filter 260 separates out either the 6 MHz channel B signal (for upstream repeaters) or the 12 MHz channel C signal (for downstream repeaters). Envelope detector 262 provides an output signal corresponding to the signal strength at the selected filter frequency, and waveshaping circuit 264 completes the regeneration of the baseband signal by providing sharp transitions. The optical transmitter portion of the repeater would be similar to the circuit of FIG. 7A, except that only one oscillator would be needed.

Modified amplitude modulation techniques can also be used in network 196. The modified technique of FIGS. 8A-8D relies upon directional enablement tones. Local channel A is provided by the baseband signal, upstream channel B is provided by a continuous 6 MHz signal, and downstream channel C is provided by continuous 12 MHz signal. Basically, the internal terminal devices receive on the baseband and transmit both the upstream and downstream directional codes in addition to the baseband. When the upstream internal repeaters are enabled by the upstream tone, they transmit both the baseband and the upstream enablement tone. In a similar way, when the internal downstream repeaters are enabled by the downstream enablement tone, they transmit both the baseband and the downstream tone.

Figure 8A:
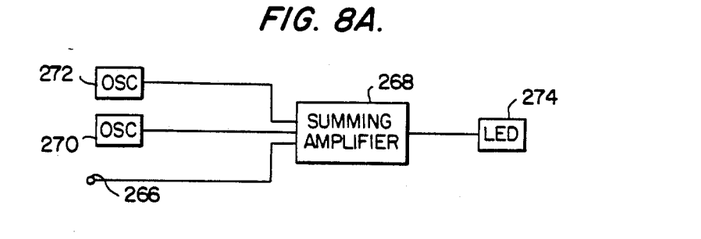
FIG. 8A is a schematic block diagram illustrating a simple example of an optical transmitter which is suitable for use in the terminal devices of FIG. 6 when directional enablement tones are employed in the network.
Figure 8B:
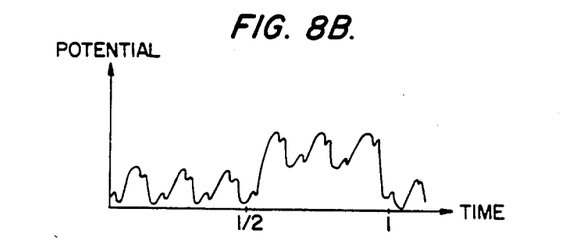
FIG. 8B is a waveform diagram illustrating an example of the electrical signal provided to the LED of FIG. 8A.

FIG. 8A illustrates an example of the optical transmitter in a transceiver of an internal terminal device when directional enablement tones are employed. The baseband electrical signal, in the form of a bit stream, is applied to terminal 266, which is electrically connected to an input of summing amplifier 268. Other inputs are provided by 6 MHz oscillator 270 (for the upstream tone, B) and 12 MHz oscillator 272 (for the downstream tone, C). The electrical output of amplifier 268 is offset to avoid zero crossings, as illustrated in FIG. 8B. LED 274 transforms this electrical signal into a corresponding optical signal. Amplifier 268 is turned OFF by circuitry not shown when the associated terminal device is not transmitting information.

Figure 8C:
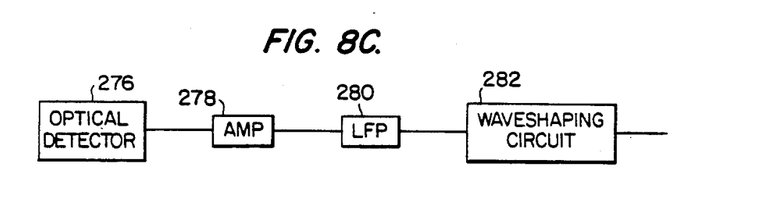
FIG. 8C is a schematic block diagram illustrating a simple example of an optical receiver which is suitable for use in the terminal devices of FIG. 6 when directional enablement tones are employed in the network.

FIG. 8C illustrates an example of the optical receiver in the transceiver of an internal terminal device when directional enablement tones are employed. The optical signal is received by optical detector 276 and amplified by amplifier 278. The 6 and 12 MHz signals are removed by a lowpass filter to 280 and sharp transitions are imparted by wave-shaping circuit 282.

Figure 8D:
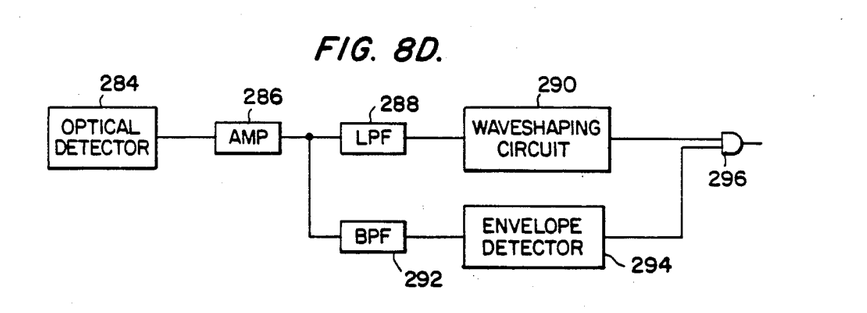
FIG. 8D is a schematic block diagram illustrating a simple example of the optical receiver portion of a repeater suitable for use in the network of FIG. 6 when directional enablement tones are employed.

FIG. 8D illustrates an example of the optical receiver portion of an internal repeater when directional enablement tones are employed. The optical signal is received by optical detector 284 and amplified by amplifier 286. The baseband signal is regenerated by a lowpass filter 288 and wave-shaping circuit 290. At the same time bandpass filter 292 and envelope detector 294 determine whether the upstream enablement tone (channel B) or the downstream enablement tone (channel C) is present, the frequency response of filter 292 being selected accordingly. Assume that the FIG. 8D optical receiver is employed in an upstream internal repeater, for example, that bandpass filter 292 is centered on the channel B frequency, that is, 6 MHz, and that a baseband signal in addition to the 6 MHz tone impinge upon detector 284. In this case the output of envelope detector 294 is "1" throughout the message transmission, so that the output of AND gate 296 depends upon the baseband signal. The optical transmitter portion of the repeater would be similar to the circuit of FIG. 8A, except that only the oscillator for the upstream signal would be needed.

Figure 9:
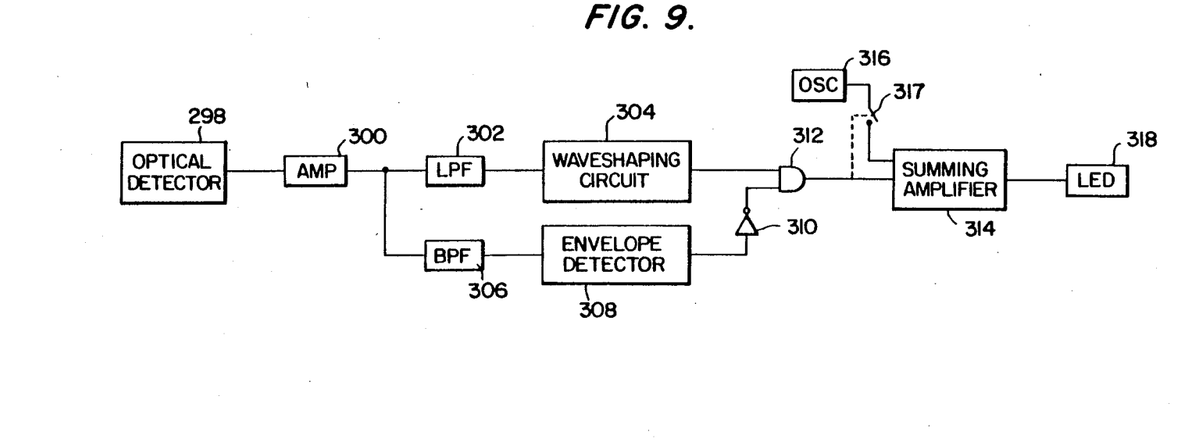
FIG. 9 is a schematic block diagram illustrating a simple example of a repeater suitable for use in the network of FIG. 6 when directional inhibit tones are employed in the network.

In the modified system employing directional inhibit signals, a repeater transfers the channel A (baseband) signal unless it is accompanied by an inhibit signal. Thus, upstream repeaters would be inhibited by the downstream tone, while downstream repeaters would be inhibited by the upstream tone. This permits a simplification of the terminal devices; the optical transmitter of the transceiver need only transmit on the baseband channel. The optical receiver of the transceiver could be as is illustrated in FIG. 8C. FIG. 9 illustrates an example of an internal repeater, both the optical receiver and the optical transmitter portions, for use in a network employing directional inhibit tones. In FIG. 9, the optical signal is received by optical dedector 298 and amplified by amplifier 300. Low pass filter 302 and waveshaping circuit 304 regenerate the baseband signal. At the same time bandpass filter 306 and envelope detector 308 determine whether a predetermined inhibit tone is present. For example if the repeater of FIG. 9 is a downstream repeater, bandpass filter 306 would be tuned to the downstream inhibit tone. Invertor 310 is connected between envelope detector 308 and an input of AND gate 312, so that the baseband signal appears at the output of gate 312 unless the downstream inhibit tone is received. As a result it will be apparent that the output of gate 312 represents the baseband signal regardless of whether detector 298 receives the baseband signal alone or the baseband signal accompanied by the upstream inhibit directional tone. Regardless of which case occurs, summing amplifier 314 adds an upstream inhibit tone provided by oscillator 316 via switch 317 and illuminates LED 318 accordingly.

Figure 10:
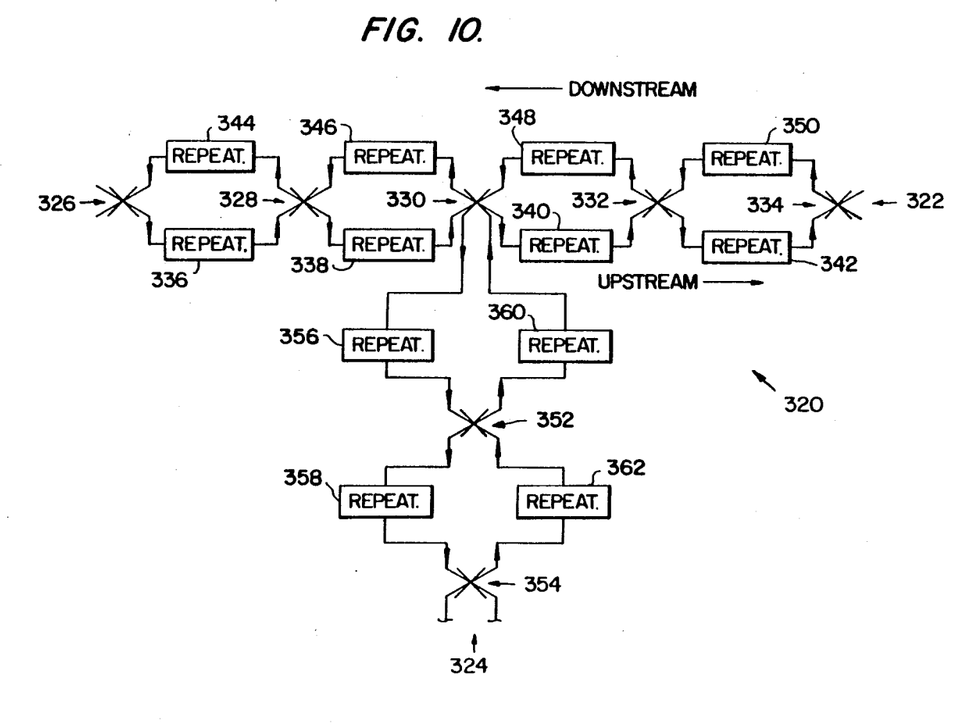
FIG. 10 schematically illustrates an embodiment of the present invention in which the network branches.

If desired a linear fiber optic network, such as network 196 in FIG. 6, can be modified to provide branches. Such a modification is illustrated in FIG. 10, wherein multi-star fiber optic network 320 has main portion 322 and branch portion 324. Main portion 322 includes stars, 326, 328, 330, 332, and 334, upstream repeaters 336, 338, 340, and 342, and downstream repeaters 344, 346, 348, and 350. Branch portion 324, which is joined to main portion 322 at star 330, includes stars 352 and 354, branch-out repeaters 356 and 358, and branch-in repeaters 360 and 362.

To accommodate branch portion 324, an additional optical channel, channel D, is needed by some of the repeaters connected directly to star 330. Each repeater providing a signal to star 330 transmits on channel A (the terminal device channel) and one of the channels B, C, or D. Each repeater receiving a signal from start 330 receives on two of the channels B, C, and D. Table II below illustrates the use of the additional channel (it being noted that branch portion 324 is assumed to extend beyond star 352 in Table II; otherwise, if star 354 were an external star, repeater 358 would only need to transmit on channel A):

TABLE II

|  | TRANSMITTING CHANNEL | RECEIVING CHANNEL |
|---|---|---|
| UPSTREAM REPEATERS |  |  |
| 336 | A and B | B |
| 338 | A and B | B |
| 340 | A and B | B and D |
| 342 | A | B |
| DOWNSTREAM REPEATERS |  |  |
| 344 | A | C |
| 346 | A and C | C and D |
| 348 | A and C | C |
| 350 | A and C | C |
| BRANCH-OUT REPEATERS |  |  |
| 356 | A and B | B and C |
| 358 | A and B | B |
| BRANCH-IN REPEATERS |  |  |
| 360 | A and D | C |

TABLE II-continued

|  | TRANSMITTING CHANNEL | RECEIVING CHANNEL |
|---|---|---|
| 362 | A and C | C |

In general, if N repeater chains are connected to a star, each repeater receiving from the star receives on N−1 channels. A total of N+1 channels are required at the junction, one for the terminal devices and one for each repeater transmitting to the star.

From the foregoing discussion it will be apparent that the present invention provides a system for adding gain between stars to compensate for repeated division of optical power as the signal passes from star to star in a multi-star fiber optic network. Repeaters can be inserted between the stars without introducing instability by providing optical signals on a plurality of channels. This may be accomplished by wavelength multiplexing, frequency modulation, or amplitude modulation techniques, including modified AM techniques which utilize directional enable or inhibit tones.

It will be understood that the above description of the present invention is susceptible to various modifications, changes, and adaptations, and the same are intended to be comprehended within the meaning and range of equivalents of the appended claims.

What is claimed is:

1. A fiber optic network for interconnecting a plurality of terminal devices each having a transceiver with an optical transmitter for emitting optical signals and an optical receiver for receiving optical signals, comprising:

a first star having a plurality of light input and exit ports for connection to the optical transmitters and receivers, respectively, of transceivers in terminal devices, said first star additionally having a further light input port and a further light exit port;

a second star having a plurality of light input and exit ports for connection to the optical transmitters and receivers, respectively, of transceivers in other terminal devices, said second star additionally having a further light input port and a further light exit port; and means connecting said further light exit port of said first star to said further light input port of said second star and connecting said further light exit port of said second star to said further light input port of said first star for adding gain to optical signals conveyed from one star to the other while avoiding reflections back and forth between said stars, said means including an upstream repeater having optical receiver means for receiving an optical signal from said further light exit port of said first star and optical transmitter means for emitting an optical signal to said further light input port of said second star, and including a downstream repeater having optical receiver means for receiving an optical signal from said further light exit port of said second star and optical transmitter means for emitting an optical signal to said further light input port of said first star, the optical transmitter means of each repeater emitting optical signals to which the optical receiver means of the other repeater is insensitive, wherein the optical transmitters in the transceivers of the terminal devices include means for emitting optical signals on a plurality of channels having the same optical wavelength, and wherein for each repeater the optical receiver means includes means for receiving optical signals on one channel and the optical transmitter means includes means for emitting optical signals on at least one different channel.

2. The network of claim 1, wherein the channels include a baseband channel and at least one directional enable tone channel, and wherein for each repeater said optical receiver means comprises means for receiving a baseband signal and means responsive to a directional enable tone for gating the baseband signal.

3. The network of claim 1, wherein the optical transmitters in the transceivers of the terminal devices emit the optical signals on first and second channels and the optical receivers in the transceivers of the terminal devices receive the optical signals on the first channel, and wherein for each repeater said optical receiver means comprises means for receiving said optical signals on the first channel and said optical transmitter means comprises means for emitting optical signals on the second channel.

4. The netwwork of claim 1, further comprising at least one additional star and means for optically connecting said at least one additional star in a sequence with said first and second star.

5. The network of claim 1, wherein said first star additionally has another light input port and another light exit port, and further comprising a branch chain including at least one star and a plurality of repeaters optically connected to said another input and exit ports.

6. The network of claim 1, wherein at least one of the channels is a frequency modulated channel.

7. The network of claim 6, wherein at least one of the channels is a baseband channel.

8. The network of claim 7, wherein for each repeater said optical receiver means comprises means for receiving a frequency modulated optical signal and said optical transmitter means comprises means for emitting at least a baseband signal.

9. The network of claim 1, wherein at least one of the channels is an amplitude modulated channel.

10. The network of claim 9, wherein at least one of the channels is a baseband channel.

11. The network of claim 10, wherein for each repeater said optical receiver means comprises means for receiving an amplitude modulated optical signal and said optical transmitter means comprises means for emitting at least a baseband signal.

12. A fiber optical network for interconnecting a plurality of terminal devices each having a transceiver with an optical transmitter for emitting optical signals and an optical receiver for receiving optical signals, comprising:
- a first star having a plurality of light input and exit ports for connection to the optical transmitters and receivers, respectively, of transceivers in terminal devices, said first star additionally having a further light input port and a further light exit port;
- a second star having a plurality of light input and exit ports for connection to the optical transmitters and receivers, respectively, of transceivers in other terminal devices, said second star additionally having a further light input port and a further light exit port; and
- means connecting said further light exit port of said first star to said further light input port of said second star and connecting said further light exit port of said second star to said further light input port of said first star for adding gain to optical signals conveyed from one star to the other while avoiding reflections back and forth between said stars, said means including an upstream repeater having optical receiver means for receiving an optical signal from said further light exit port of said first star and optical transmitter means for emitting an optical signal to said further light input port of said second star, and including a downstream repeater having optical receiver means for receiving an optical signal from said further light exit port of said second star and optical transmitter means for emitting an optical signal to said further light input port of said first star, the optical transmitter means of each repeater emitting optical signals to which the optical receiver means of the other repeater is insensitive,
- wherein the optical transmitters in the transceivers of terminal devices connected to one of said stars emit optical signals on first and second channels, wherein the optical transmitters in the transceivers of terminal devices connected to the other of said stars emit optical signals on first, second, and third channels, wherein the optical receivers in the transceivers of terminal devices connected to either star receive optical signals on the first channel, wherein for one of said repeaters the optical receiver means comprises means for receiving optical signals on the second channel and the optical transmitter means comprises means for emitting optical signals on the first and second channels, and wherein for the other of said repeaters the optical receiver means comprises means for receiving optical signals on the third channel and the optical transmitter means comprises means for emitting optical signals on the first channel.

13. The network of claim 12, wherein the channels occur at different optical wavelengths.

14. The network of claim 12, further comprising at least one additional star and means for optically connecting said at least one additional star in sequence with said first and second stars.

15. The network of claim 12, wherein one of said stars has another light input port and another light exit port, and further comprising a branch chain including at least one star and a plurality of repeaters optically connected to said another input and exit ports.

16. The network of claim 12, wherein the channels occur at the same optical wavelength.

17. The network of claim 16, wherein one of the channels is a baseband channel and the remaining channels are frequency modulated channels.

18. The network of claim 16, wherein one of the channels is a baseband channel and the remaining channels are amplitude modulated channels.

19. A fiber optic network for interconnecting a plurality of terminal devices each having a transceiver with an optical transmitter for emitting optical signals and an optical receiver for receiving optical signals, comprising:
- a first star having a plurality of light input and exit ports for connection to the optical transmitters and receivers, respectively, of transceivers in terminal devices, said first star additionally having a further light input port and a further light exit port;
- a second star having a plurality of light input and exit ports for connection to the optical transmitters and receivers, respectively, of transceivers in other terminal devices, said second star additionally having a further light input port and a further light exit port; and means connecting said further light exit port of said first star to said further light input port of said second star and connecting said further light exit port of said second star to said further light input port of said first star for adding gain to optical signals conveyed from one star to the other while avoiding reflections back and forth between said stars, said means including an upstream repeater having optical receiver means for receiving an optical signal from said further light exit port of said first star and optical transmitter means for emitting an optical signal to said further light input port of said second star, and including a downstream repeater having optical receiver means for receiving an optical signal from said further light exit port of said second star and optical transmitter means for emitting an optical signal to said further light input port of said first star, the optical transmitter means of each repeater emitting optical signals to which the optical receiver means of the other repeater is insensitive, wherein the optical transmitters in the transceivers of terminal devices connected to either star emit optical signals on first, second, and third channels, wherein the optical receivers in the transceivers of terminal devices connected to either star receive optical signals on the first channel, wherein for one of said repeaters the optical receiver means comprises means for receiving optical signals on the second channel and the optical transmitter means comprises means for emitting optical signals on the first and second channels, and wherein for the other of said repeaters the optical receiver means comprises means for receiving optical signals on the third channel and the optical transmitter means comprises means for emitting optical signals on the first and third channels.

20. The network of claim 19, wherein the channels occur at different optical wavelengths.

21. The network of claim 19, further comprising at least one additional star and means for optically connecting said at least one additional star in sequence with said first and second stars.

22. The network of claim 19, wherein one of said stars has another light input port and another light exit port, and further comprising a branch chain including at least one star and a plurality of repeaters optically connected to said another input and exit ports.

23. The network of claim 19, wherein the channels occur at the same optical wavelength.

24. The network of claim 23, wherein one of the channels is a baseband channel and the remaining channels are frequency modulated channels.

25. The network of claim 23, wherein one of the channels is a baseband channel and the remaining channels are amplitude modulated channels.

26. A fiber optic network for interconnecting a plurality of terminal devices each having a transceiver with an optical transmitter for emitting optical signals and an optical receiver for receiving optical signals, comprising:

a first star having a plurality of light input and exit ports for connection to the optical transmitters and receivers, respectively, of transceivers in terminal devices, said first star additionally having a further light input port and a further light exit port;

a second star having a plurality of light input and exit ports for connection to the optical transmitters and receivers, respectively, of transceivers in other terminal devices, said second star additionally having a further light input port and a further light exit port; and means connecting said further light exit port of said first star to said further light input port of said second star and connecting said further light exit port of said second star to said further light input port of said first star for adding gain to optical signals conveyed from one star to the other while avoiding reflections back and forth between said stars, said means including an upstream repeater having optical receiver means for receiving an optical signal from said further light exit port of said first star and optical transmitter means for emitting an optical signal to said further light input port of said second star, and including a downstream repeater having optical receiver means for receiving an optical signal from said further light exit port of said second star and optical transmitter means for emitting an optical siganl to said further light input port of said first star, the optical transmitter means of each repeater emitting optical signals to which the optical receiver means of the other repeater is insensitive, wherein the optical transmitters in the transceivers of the terminal devices comprise means for emitting signals on a baseband channel, and wherein for each repeater said optical transmitter means comprises means for emitting a baseband signal and a directional inhibit tone and said optical receiver means comprises means for receiving a baseband signal and means responsive to a directional inhibit tone for controlling passage of the baseband signal.

* * * * *